United States Patent Office 3,154,423
Patented Oct. 27, 1964

3,154,423
COMPOSITION FOR TREATING MEAT PRIOR TO PACKAGING
Marvin M. Voegeli, Downers Grove, and Henry J. Gorsica, Du Page, Ill., assignors to B. Heller & Company, a corporation of Illinois
No Drawing. Filed June 15, 1961, Ser. No. 117,270
11 Claims. (Cl. 99—222)

This invention relates to a composition for the treatment of animal materials, such as meat and blood to maintain a red color. More particularly, it deals with a method for the treatment of meat so that upon packaging in air permeable envelopes, the meat will maintain a bright red color.

The present invention resides in new treating compositions capable of maintaining an attractive uniform bright red color in packaged red meats. The compositions comprise a poising agent to control oxidation-reduction potential, a sequestering agent which can be used in foods and is primarily adapted to complex polyvalent metal ions, a food grade inhibitor of the elimination of oxygen from air through bacterial activity and a phosphate buffering agent.

Meat contains coloring matter or pigments including myoglobin, hemoglobin, and cytochrome, all of which are compounds of ferro- or ferriheme and protein. Myoglobin, to illustrate by reference to one of the pigments present in red meat is purplish-red in color and may change color either through reduction or oxidation. It is, for example, converted to a bright red color by oxidation to a limited extent, i.e., the stage wherein the material is referred to as oxymyoglobin. The bright red oxymyoglobin may be further oxidized, and in the latter stage becomes greyish brown in color.

Appearance is a factor of major importance in the sale of prepackaged meat. Buyers associate a bright red color with fresh red meat. Meat which has turned brown or greyish brown, even though it has been cut or ground less than 24 hours, is often rejected as unacceptably old.

The problem that confronts the packager of red meat is that the meat can turn brown irregardless of whether the meat is packaged in materials which are permeable to or are impermeable to oxygen or air.

When meat is packaged, for example, in glass or in plastic film such as "Saran" wrap, which are not permeable to air, a change in the color of the fresh meat from red to brown will occur in a relatively short time. When packers of red meat attempted to overcome this difficulty by turning to air-permeable plastic films such as special oxygen permeable cellophane, they found that red meats also turned brown in this type of packaging. Treatment of the meat with agents such as sodium bicarbonate, sodium ascorbate, etc., prior to packaging or wrapping does not prevent the objectionable change in color of the packaged meat from occurring.

It has been known that nicotinic acid, a vitamin sometimes referred to as niacin could be reacted with the myoglobin of red meat to form a red pigment which was slow to turn reddish brown. Nicotinic acid alone showed best results when air was excluded from the meat as when the meat was sealed in air impermeable envelopes. However, while the reaction with nicotinic acid slows the browning of meat where air was excluded from contact with the surface of the meat, the exterior of the meat nevertheless turns brown in a short period of time.

It has now been discovered that fresh or uncured red meat packaged in air permeable packaging materials will maintain a bright red color if pretreated with a composition comprising an oxidation reduction poising agent selected from the group consisting of ascorbate, erythorbate and reductate anion-containing water soluble compounds, a sequestering agent capable of complexing polyvalent metal ions, a food grade inhibitor of the removal of oxygen from air through bacterial activity and a phosphate buffering agent in quantity to buffer a solution of the composition to a pH between about 5 and about 7.

Poising agents are incorporated in the compositions of this invention to control the oxidation-reducton potental and to avoid fluctuation in conditions to an extent permitting either strong reduction of the coloring compounds such as myoglobin or appreciable oxidation of the ferrous ions therein. Useful poising agents are the water soluble sodium and potassium salts of ascorbic acid, erythorbic acid and reductic acid.

Useful sequestering agents are those having an affinity for polyvalent metal iron catalysts of oxidation, particularly for the metal ions, iron and nickel. Some of the sequestering agents show a greater affinity for one polyvalent metal ion than another and, therefore, it is sometimes advantageous to use a mixture of agents which will not only tie up iron and nickel but also copper and zinc. Typical agents of this type permitted in foods are the sodium and potassium salts of, for example, citric acid, tartaric acid, ethylenediaminetetraacetic acid, and the like.

A limited number of compounds which will inhibit the removal of oxygen from air diffusing through a meat packaging envelope by restricting bacterial activity, are permitted in foods and these only in limited amounts. Among the compounds effective for the purposes of this invention in the amounts permissible are parahydroxybenzoic acid and esters thereof such as the methyl, ethyl, propyl and butyl esters of parahydroxybenzoic acid, water soluble alkali metal salts of parahydroxybenzoic acid and sodium benzoate.

These useful compounds differ in effectiveness of inhibition of the oxygen removal. The minimum effective amount in particular varies from compound to compound. For example, the minimum amount of sodium benzoate is about 0.01% based upon the weight of the meat treated. Water soluble derivatives of parahydroxybenzoic acid are more effective inhibitors of oxygen removal than sodium benzoate and shown an appreciable effect when use in amounts as small as 0.001% based upon the weight of the meat treated. The maximum amount of the compounds to be used in compositions of this invention is limited to that permissible under the Pure Food and Drug restrictions. Thus, sodium benzoate may may be used in amounts between about 0.01% and 0.1% by weight, whereas, for example, the propyl ester of parahydroxybenzoic acid may be used in amounts between 0.001% and 0.1%.

Phosphate buffering agents useful in this invention, are the salts which will bring an aqueous solution of the mixture to a pH value close to the natural pH of meat. This natural pH of untreated meat is 6.2. The buffering agent should maintain a pH in the range between about 5 and about 7, with a pH in the range between about 6.0 and 6.5 preferred.

Typical phosphate buffers are the water soluble sodium and potassium phosphates such as pyrophosphate, orthophosphate, hexametaphosphate and tripolyphosphate. Some of the phosphate salts, such as trisodiumphosphate function purely as a buffer. On the other hand, polymerized phosphates such as tetrasodium or tetrapotassium pyrophosphate act both as a buffer and as a sequestrant for heavy metal ions. It is preferred for the purposes of this invention, to use the polymerized phosphates because they supplement the action of the sequestering agents through strong affinity for ions such as copper which may be only weakly complexed by sequestering agents having an affinity for iron and nickel.

In this discussion, reference is made to the use of various salts. It will be understood that the basic composition may be prepared from the free acids such as, for example, citric acid and erythorbic acid, provided alkali in at least molecular equivalent amounts for reaction with the acids is incorporated in the mixture. The compositions of this invention may also be formed from combinations of various salts, free acids and alkalis. Alkalis useful for this purpose are sodium carbonate, sodium bicarbonate, potassium carbonate, potassium bicarbonate.

Basic compositions of the above discussed type may have inert material or diluents added thereto such as salt (sodium chloride), sugar, dextrose, lactose, etc. The basic composition may be adapted to special purposes such as use in pork sausage, by incorporation therein of essential oils, oleo-resins of spices and fat antioxidants such as butylated hydroxy anisole, butylated hydroxy toluene and propyl gallate. Where the basic composition is specifically adapted for incorporation into such materials as portion-packed meats, there may be incorporated therein additives such as cereals, dry milk powder, casein, sodium caseinate, preservatives, enzyme tenderizers, for example, ficin, papain, bromelin and the like, vegetable gums, etc.

In general, as indicated previously, it is preferred for practical purposes to add the dry composition to coarse ground meat and then to regrind the mixture to effect uniform distribution of the composition. Similarly, in the wet process, the meat can be soaked or injected with the solution of the composition. From the discussion as applied to the ground meat, it is not to be understood that the use of the compositions of this invention are limited to application to this physical form of red meat. The dry or wet compositions may be applied to the surface of steaks, roasts, and other solid pieces or cuts of meat as well as applied by means of injection and similar methods of treatment. Basic compositions in dry form or in aqueous solution form may or may not contain diluents.

Dry compositions may contain the essential components in amounts by weight as follows.

Material: Percent by weight
Phosphate buffering agent _____ 50–77
Poising agents _____ 25–8
Inhibitor of $O_2$ removal _____ 0.32–3.7
Sequestering agent _____ 25–15

Inert material may be added to the above composition as desired. In the case of salt, the amount of diluent salt is generally limited so that no more than a total of 2 lbs. of diluted dry composition would be incorporated per 100 lbs. of meat being treated.

Meat treated in accordance with this invention should contain amounts of the components of the composition falling within the following ranges.

Material: Percent by weight
Phosphate buffering salt _____ 0.2–2
Poising agent _____ 0.1–0.2
Inhibitor of O removal _____ 0.001–0.1
Sequestering agent _____ 0.01–0.4
Inerts plus meat _____ Balance When utilizing the above composition for the treatment of meat, sufficient amounts of poising agent plus phosphate buffering salt must be incorporated to constitute 0.3% by weight of the treated meat if the composition is to have a discernible effect upon the color of red meat.

The invention is more specifically described by reference to specific examples illustrating the composition and the referred manner of use of the composition. Obviously, other formulation techniques and methods of use other than those described in detail in the following examples can be employed depending upon the exigencies of the situation.

EXAMPLE I

A dry meat treating mixture was prepared by dry blending the following:

Ozs.
Trisodiumphosphate _____ 3.2
Sodium citrate _____ 1.6
Sodium erythorbate _____ 1.6
Sodium chloride _____ 8.0
Sodium benzoate _____ 1.6
_____
16.0

100 lbs. of ground ground round steak was treated by dry mixing with 16 ozs. of the above composition and regrinding the resultant mixture to obtain a uniform distribution of the treating composition.

The reground meat contained on an approximate weight basis:

Percent
Trisodiumphosphate _____ 0.2
Sodium citrate _____ 0.1
Sodium erythorbate _____ 0.1
Sodium chloride _____ 0.5
Sodium benzoate _____ 0.1

Samples of untreated and treated meat were shaped into patties and the surface thereof rendered relatively smooth. One-half of each portion of treated meat was wrapped in special oxygen permeable cellophane while the other half was left unwrapped and was stored in a transparent plastic box. Packaged patties are stored in a refrigerator maintained at about 45° F. and the color of the exposed side of the control pattie and pattie containing treated meat are compared daily for 5 days.

The results are shown below:

*Table I*

| Sample | Observed Color of Sample | | |
| --- | --- | --- | --- |
| | 1 day | 3 days | 5 days |
| Control, wrapped | Grey Brown | Brown | Brown. |
| Treated Pattie 1, wrapped | Bright red | Bright red | Red. |
| Control, unwrapped | Fading red | Reddish brown | Brown. |
| Treated Pattie 2, unwrapped | Bright red | Bright red | Red. |

EXAMPLE II

A dry meat treating mixture was prepared by dry blending the following:

Ozs.
Tetrapotassiumpyrophosphate _____ 3.2
Potassium citrate _____ 1.6
Erythorbic acid _____ 1.6
Propyl ester of parahydroxybenzoic acid _____ 1.6
_____
8.0

100 lbs. of ground round steak was treated by dry mixing with 8 ozs. of the above composition and regrinding the resultant mixture to obtain a uniform distribution of the treating composition.

The reground meat contained on an approximate weight basis:

Percent
Tetrapotassiumpyrophosphate _____ 0.2
Potassium citrate _____ 0.1
Erythorbic acid _____ 0.1
Propylester of parahydroxybenzoic acid _____ 0.1
_____
0.5

Samples of untreated and treated meat were shaped into patties and the surface thereof rendered relatively smooth. One-half of each portion of treated meat was wrapped in special oxygen permeable cellophane while the other half was left unwrapped and was stored in a transparent plastic box. Packaged patties are stored in a refrigerator maintained at about 45° F. and the color of the exposed side of the control pattie and pattie containing treated meat are compared daily for 5 days.

The results are shown below:

*Table II*

| Sample | Observed Color of Sample | | |
|---|---|---|---|
| | 1 day | 3 days | 5 days |
| Control, wrapped | Turning brown | Brown | Brown. |
| Treated Pattie 3, wrapped | Bright red | Red | Turning grey. |
| Control, unwrapped | Turning grey | Brownish red. | Reddish brown. |
| Treated Pattie 4, unwrapped. | Bright red | Bright red | Turning grey. |

EXAMPLE III

A dry meat treating mixture was prepared by dry blending the following:

| | Ozs. |
|---|---|
| Tetrapotassiumpyrophosphate | 3.2 |
| Potassium citrate | 1.6 |
| Sodium ascorbate | 1.6 |
| Propylester of parahydroxybenzoic acid | 1.6 |
| Sodium chloride | 8.0 |
| | 16.0 |

100 lbs. of ground round steak was treated by dry mixing with 16 ozs. of the above composition and regrinding the resultant mixture to obtain a uniform distribution of the treating composition.

The reground meat contained on an approximate weight basis:

| | Percent |
|---|---|
| Tetrapotassiumpyrophosphate | 0.2 |
| Potassium citrate | 0.1 |
| Sodium ascorbate | 0.1 |
| Propylester of parahydroxybenzoic acid | 0.1 |
| Sodium chloride | 0.5 |
| | 1.0 |

Samples of untreated and treated meat were shaped into patties and the surface thereof rendered relatively smooth. One-half of each portion of treated meat was wrapped in special oxygen permeable cellophane while the other half was left unwrapped and was stored in a transparent plastic box. Packaged patties are stored in a refrigerator maintained at about 45° F. and the color of the exposed side of the control pattie and pattie containing treated meat are compared daily for 5 days.

The results are shown below:

*Table III*

| Sample | Observed Color of Sample | | |
|---|---|---|---|
| | 1 day | 3 days | 5 days |
| Control, wrapped | Grey brown | Brown | Brown. |
| Treated Pattie 5, wrapped. | Bright red | Bright red | Red. |
| Control, unwrapped | Brownish red | Reddish brown | Brown. |
| Treated Pattie 6, unwrapped. | Bright red | Bright red | Red. |

EXAMPLE IV

A dry meat treating mixture was prepared by dry blending the following:

| | Ozs. |
|---|---|
| Tetrapotassiumpyrophosphate | 3.2 |
| Ascorbic acid | 1.6 |
| Citric acid | 1.6 |
| Methyl ester of parahydroxybenzoic acid | 1.6 |
| Potassium carbonate | 1.6 |
| | 9.6 |

100 lbs. of ground round steak was treated by dry mixing with 9.6 ozs. of the above composition and regrinding the resultant mixture to obtain a uniform distribution of the treating composition.

The reground meat contained on an approximate weight basis:

| | Percent |
|---|---|
| Tetrapotassiumpyrophosphate | 0.2 |
| Ascorbic acid | 0.1 |
| Citric acid | 0.1 |
| Methyl ester of parahydroxybenzoic acid | 0.1 |
| Potassium carbonate | 0.1 |
| | 0.6 |

Samples of untreated and treated meat were shaped into patties and the surface thereof rendered relatively smooth. One-half of each portion of treated meat was wrapped in special oxygen permeable cellophane while the other half was left unwrapped and was stored in a transparent plastic box. Packaged patties are stored in a refrigerator maintained at about 45° F. and the color of the exposed side of the control pattie and pattie containing treated meat are compared daily for 5 days.

The results are shown below:

*Table IV*

| Sample | Observed Color of Sample | | |
|---|---|---|---|
| | 1 day | 3 days | 5 days |
| Control, wrapped | Brown | Brown | Brown. |
| Treated Pattie 7, wrapped. | Bright red | Bright red | Red. |
| Control, unwrapped | Brownish red | Reddish brown | Brown. |
| Treated Pattie 8, unwrapped. | Bright red | Bright red | Red. |

EXAMPLE V

A basic meat treating mixture was prepared by dry blending:

| | Ozs. |
|---|---|
| Tetrapotassiumpyrophosphate | 0.32 |
| Potassium citrate | 0.16 |
| Sodium salt of parahydroxybenzoic acid | 0.16 |
| Erythorbic acid | 0.16 |
| | 0.80 |

The mixture was dissolved in 32 fluid ounces of water. Sirloin steaks cut to approximately ¾ inch thickness were painted with the solution in amounts to use the 0.8 oz. of basic composition to treat 100 lbs. of steak.

Strips of treated and untreated meat were cut in half, with one-half of each strip being stored "as is" in a plastic box, while the other half was wrapped tightly in cellophane. The edges of the cellophane wrapper were sealed with strips of Scotch tape to exclude air as much as possible. The wrapped strips of meat were then stored in transparent plastic boxes alongside of the unwrapped strips. The plastic boxes containing the meat are stored in a refrigerator maintained at about 45° F., and the color of the exposed sides of the strips of meat are compared daily for 5 days.

The results are shown below:

*Table V*

| Sample | Observed Color of Sample | | |
|---|---|---|---|
| | 1 day | 3 days | 5 days |
| Control strip, unwrapped | Red | Brownish red. | Reddish brown. |
| Treated strip, unwrapped | do | Red | Brownish red. |
| Control strip, wrapped | Brownish red. | Brown | Brown. |
| Treated strip, wrapped | Red | Red | Brownish red. |

The compositions of this invention comprise four essential elements. This composition has a synergistic effect and the components of the composition cooperate to maintain the red color of packaged fresh or uncured meats during storage, subsequent freezing or other operations, i.e., under conditions where any two or three of the four components of the composition fail.

The inadequacy of the various compositions having three of the four components of the previously described compositions is most pronounced when compared on the basis of effectiveness in commercial practice. To illustrate with reference to ground red meat, the grinding is done in equipment using knives, plates, etc. The ground meat will contain copper derived from bronze knives, will contain iron and nickel derived from steel plates, and the like. Metal contaminants act as catalyzers of one of the primary activities in meat, namely, change of color due to oxidation.

If compounds such as parahydroxybenzoic acid, which inhibits the removal of oxygen from the air diffusing through a meat packaging envelope by restricting bacterial activity, are not present in the composition, i.e., the meat is treated with a three component system of, for example, the tetrapotassiumphosphate, potassium citrate and erythorbic acid of the combination shown in Example II, the cellophane wrapped meat rapidly darkens from red to brown.

If fresh ground red meat is treated only with a compound which inhibits oxygen removal activity, for example, the propyl ester of parahydroxybenzoic acid, and the meat is wrapped in special oxygen permeable cellophane, the meat darkens rapidly from red to brown.

If any one of the compounds, citrate, ascorbate or phosphate are omitted from the composition, the ground meat darkens in color at an accelerated rate, fails to maintain a bright color throughout the product, etc.

From the foregoing description and explanation, it can readily be appreciated that the constituents of the composition of this invention cooperate to attain results which the two and three component combinations do not accomplish.

It will be understood that modifications may be made in carrying out the present invention without departing from the spirit and scope thereof and the invention is to be limited only by the appended claims.

We claim:

1. A composition for treating fresh meat containing myoglobin to maintain the red color thereof when packaged in gas permeable envelopes comprising as essential constituents, between about 8% and about 25% by weight of sodium erythorbate, between about 15% and about 25% by weight of sodium citrate, between about 0.32% and about 3.7% by weight of sodium benzoate and trisodiumphosphate in quantity to buffer a solution of the composition to a pH between about 5 and about 7.

2. A composition for treating fresh meat containing myoglobin to maintain the red color thereof when packaged in gas permeable envelopes comprising as essential constituents, between about 8% and about 25% by weight of erythorbic acid, between about 15% and about 25% by weight of potassium citrate, between about 0.32% and about 3.7% by weight of propyl ester of parahydroxybenzoic acid, tetrapotassium pyrophosphate in quantity to buffer a solution of the composition to a pH between about 5 and about 7.

3. The method of treating fresh meat containing myoglobin to maintain the red color thereof when packaged in gas permeable envelopes which comprises incorporating in said meat from about 0.01% to 0.2% of sodium erythorbate, from about 0.01% to 0.4% of a food grade sodium citrate, from about 0.001% to 0.1% of propyl ester of parahydroxybenzoic acid and from about 0.02% to 2% of trisodium phosphate with the minimum total of the amount of phosphate plus erythorbate being 0.3% based on the weight of the meat.

4. The method of treating fresh meat containing myoglobin to maintain the red color thereof when packaged in gas permeable envelopes which comprises depositing on the surface of meat an aqueous solution of a composition containing as basic constituents from about 0.01% to 0.2% of sodium ascorbate, from about 0.01% to 0.4% potassium citrate, from about 0.001% to 0.1% of alkali metal salt of parahydroxybenzoic acid and 0.02% to 2% of tetrasodiumpyrophosphate, with the minimum total of the amount of phosphate plus erythorbate being 0.3% based on the weight of the meat.

5. A composition for treatment of fresh meat containing myoglobin to maintain the red color thereof when packaged in gas permeable envelopes comprising by weight as essential constituents, between about 8% and about 25% of an oxidation-reduction poising agent selected from the group of ascorbate, erythorbate and reductate anion-containing water soluble compounds, between about 15% and about 25% of a food grade sequestering agent for polyvalent metal ions, between about 0.32% and about 3.7% of an inhibitor of oxygen elimination through bacterial activity selected from the group consisting of water-soluble alkali metal salts of parahydroxybenzoic acid, alkyl esters of parahydroxybenzoic acid in which the alkyl group contains 1 to 4 carbon atoms and sodium benzoate, and a phosphate buffering agent in quantity to buffer a solution of the composition to a pH between about 5 and about 7.

6. A composition for treatment of fresh meat containing myoglobin to maintain the red color thereof when packaged in gas permeable envelopes comprising by weight as essential constituents, between about 8% and about 25% of an oxidation-reduction poising agent selected from the group of ascorbate, erythorbate and reductate anion-containing water soluble compounds, between about 15% and about 25% of a food grade sequestering agent for polyvalent metal ions, between about 0.32% and about 3.7% of an inhibitor of oxygen elimination through bacterial activity selected from the group consisting of water-soluble alkali metal salts of parahydroxybenzoic acid, alkyl esters of parahydroxybenzoic acid in which the alkyl group contains 1 to 4 carbon atoms and sodium benzoate, and a water soluble phosphase buffering agent selected from the group consisting of pyrophosphate, orthophosphate, hexametaphosphate and tripolyphosphate in quantity to buffer a solution of the composition to a pH between about 5 and about 7.

7. A composition for treatment of fresh meat containing myoglobin to maintain the red color thereof when packaged in gas permeable envelopes comprising by weight as essential constituents, between about 8% and about 25% of an oxidation-reduction poising agent selected from the group consisting of ascorbate, erythorbate and reductate anion-containing water soluble compounds, between about 15% and about 25% of a food grade organic acid sequestering agent for polyvalent metal ions, an alkaline agent in molecular equivalent amounts required to neutralize free acids, between about 0.32% and about 3.7% of an inhibitor of oxygen elimination through bacterial activity selected from the group consisting of water-soluble alkali metal salts of parahydroxybenzoic acid, alkyl esters of parahydroxybenzoic acid in which the alkyl group contains 1 to 4 carbon atoms and sodium benzoate, and a phosphate buffering agent in quantity to buffer a solution of the composition to a pH between about 5 and about 7.

8. A composition for treatment of fresh meat containing myoglobin to maintain the red color thereof when packaged in gas permeable envelopes comprising by weight as essential constituents, between about 8% and about 25% of an oxidation-reduction poising agent selected from the group of ascorbate, erythorbate and reductate anion-containing water soluble compounds, between about 15% and about 25% of a food grade sequestering agent for polyvalent metal ions, between about 0.32% and about 3.7% of an inhibitor of oxygen elimination through bacterial activity selected from the group consisting of water-soluble alkali metal salts of parahydroxybenzoic acid, alkyl esters of parahydroxybenzoic acid in which the alkyl group contains 1 to 4 carbon atoms and sodium benzoate, and a phosphate buffering agent in quantity to buffer a solution of the composition to a pH between 6.0 and 6.5.

9. A composition for treatment of fresh meat containing myoglobin to maintain the red color thereof when packaged in gas permeable envelopes comprising by weight as essential constituents, between about 8% and about 25% of an oxidation-reduction poising agent selected from the group of ascorbate, erythorbate and reductate anion-containing water soluble compounds, between about 15% and about 25% of a food grade sequestering agent for polyvalent metal ions, an inhibitor of oxygen elimination through bacterial activity selected from the group consisting of water-soluble alkali metal salts of parahydroxybenzoic acid, alkyl esters of parahydroxybenzoic acid in which the alkyl group contains 1 to 4 carbon atoms and sodium benzoate, and a phosphate buffering agent in quantity to buffer a solution of the composition to a pH between about 5 and about 7 and a diluent selected from the group consisting of sodium chloride, sugar, dextrose and lactose.

10. The method of treating fresh meat containing myoglobin to maintain the red color thereof when packaged in gas permeable envelopes which comprises contacting the meat with a composition containing as essential constituents, between about 8% and about 25% by weight of an oxidation-reduction poising agent selected from the group of ascorbate, erythorbate and reductate anion-containing water soluble compounds, between about 15% and about 25% by weight of a food grade sequestering agent for polyvalent metal ions, between about 0.32% and about 3.7% by weight of an inhibitor of oxygen elimination through bacterial activity selected from the group consisting of water-soluble alkali metal salts of parahydroxy-benzoic acid, alkyl esters of parahydroxybenzoic acid in which the alkyl group contains 1 to 4 carbon atoms and sodium benzoate, and a phosphate buffering agent in quantity to buffer a solution of the composition to a pH between about 5 and about 7.

11. The method of treating fresh meat containing myoglobin to maintain the red color thereof when packaged in gas permeable envelopes which comprises incorporating in said meat from about 0.01% and 0.2% of an oxidation-reduction poising agent selected from the group of ascorbate, erythorbate and reductate anion-containing water soluble compounds, from about 0.01% to 0.4% of a food grade sequestering agent for polyvalent metal ions, from about 0.001% to 0.1% of an inhibitor of oxygen elimination through bacterial activity selected from the group consisting of water-soluble alkali metal salts of parahydroxybenzoic acid, alkyl esters of parahydroxybenzoic acid in which the alkyl group contains 1 to 4 carbon atoms and sodium benzoate, and from about 0.02% to 2% of a phosphate buffering agent with the minimum total of the amounts of phosphate plus oxidation-reduction poising agent being 0.3% based on the weight of the meat.

References Cited in the file of this patent

UNITED STATES PATENTS 2,830,907    Savich et al. _____ Apr. 15, 1958

OTHER REFERENCES

Morse: "Food Engineering," October 1955, pp. 84–86.

Landrock et al.: "Food Technology," April 1955, pages 194–196.

Butler et al.: "Food Technology" (1953), vol. 7, pages 397–400.

Neidig et al.: "The Drug and Cosmetic Industry," April 1944, pages 408–410, 481–489 (pages 408, 482 and 483 particularly relied on).

UNITED STATES PATENT OFFICE
CERTIFICATE OF CORRECTION

Patent No. 3,154,423                               October 27, 1964

Marvin M. Voegeli et al.

It is hereby certified that error appears in the above numbered patent requiring correction and that the said Letters Patent should read as corrected below.

Column 2, line 16, for "iron" read -- ion --; line 42, for "shown" read -- show --; line 48, strike out "may", first occurrence; line 56, for "betwen" read -- between --; column 3, line 59, for "O" read -- $O_2$ --; column 4, line 13, strike out "ground", first occurrence; column 4, Table I, under the heading "Sample", line 3 thereof, for "ontrol" read -- Control --; column 6, line 57, for "store d" read -- stored --; column 8, lines 42 and 43 for "phosphase" read -- phosphate --.

Signed and sealed this 9th day of March 1965.

(SEAL)
Attest:

ERNEST W. SWIDER                                         EDWARD J. BRENNER
Attesting Officer                                              Commissioner of Patents